United States Patent
Mátray et al.

(10) Patent No.: US 11,917,483 B2
(45) Date of Patent: Feb. 27, 2024

(54) REPLICATION IN A CLOUD ENVIRONMENT

(71) Applicant: Telefonaktiebolaget LM Ericsson (publ), Stockholm (SE)

(72) Inventors: Péter Mátray, Budapest (HU); Dániel Géhberger, Montreal (CA); Gábor Németh, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 396 days.

(21) Appl. No.: 17/426,823

(22) PCT Filed: Jan. 30, 2019

(86) PCT No.: PCT/EP2019/052264
§ 371 (c)(1),
(2) Date: Jul. 29, 2021

(87) PCT Pub. No.: WO2020/156662
PCT Pub. Date: Aug. 6, 2020

(65) Prior Publication Data
US 2022/0124593 A1    Apr. 21, 2022

(51) Int. Cl.
*H04W 36/32* (2009.01)
*G06F 16/27* (2019.01)
*H04L 67/1095* (2022.01)
*H04W 36/00* (2009.01)

(52) U.S. Cl.
CPC ............ *H04W 36/32* (2013.01); *G06F 16/27* (2019.01); *H04L 67/1095* (2013.01); *H04W 36/0011* (2013.01)

(58) Field of Classification Search
CPC .............. H04W 36/32; H04W 36/0011; H04L 67/1095; G06F 16/27
USPC ....................................... 455/440
See application file for complete search history.

(56) References Cited

U.S. PATENT DOCUMENTS

2011/0125704 A1* 5/2011 Mordvinova ......... G06F 16/275
707/623

OTHER PUBLICATIONS

International Search Report and Written Opinion of the International Searching Authority for PCT International Application No. PCT/EP2019/052264 dated Oct. 10, 2019.

(Continued)

*Primary Examiner* — Joel Ajayi
(74) *Attorney, Agent, or Firm* — Sage Patent Group

(57) ABSTRACT

A method for operating a replication control module is provided. The method comprises determining that a handover takes place by which a data session exchanged via a cellular network between a serving application instance and a user equipment is transferred from the serving application instance to a target application instance selected from a plurality of application instances located in a cloud environment. The method further includes determining a location of the target application instance in the cloud environment; determining target replica locations of replica of a session state data individually on a per session basis for said data session taking into account the location of the target application instance; and transmitting location information to a data handling module allowing the data handling module to distribute the replica to the determined locations of the target replica locations.

16 Claims, 11 Drawing Sheets

(56) References Cited

OTHER PUBLICATIONS

Farris et al., "Lightweight service replication for ultra-short latency applications in mobile edge networks," IEEE International Conference on Communications (ICC) 2017 Mobile and Wireless Networking, May 21, 2017 (May 21, 2017), pp. 1-6.
Gossa et al., "Proactive Replica Placement Using Mobility Prediction," IEEE Ninth International Conference on Mobile Data Management Workshops (MDMW) 2008, Piscataway, NJ, USA, Apr. 27, 2008 (Apr. 27, 2008), pp. 182-189.
Chang et al., "Adaptable Replica Consistency Service for Data Grids," IEEE Third International Conference on Information Technology: New Generations (ITNG) 2006, Las Vegas, NV, USA, Apr. 10-12, 2006, Piscataway, NJ, USA, Apr. 10, 2006 (Apr. 10, 2006), pp. 646-651.
Taleb et al., "Follow Me Cloud: Interworking Federated Clouds and Distributed Mobile Networks," Published in: IEEE Network (vol. 27, Issue: 5, Sep.-Oct. 2013), pp. 12-19.
Farris et al., "Providing ultra-short latency to user-centric 5G applications at the mobile network edge," Transactions on Emerging Telecommunications Technologies, Mar. 2017, pp. 1-14.
Farris et al., "Optimizing Service Replication for Mobile Delay-sensitive Applications in 5G Edge Network," IEEE International Conference on Communications (ICC) 2017, May 21, 2017 (May 21, 2017), pp. 1-6.
Assasa et al., "Service Mobility in Mobile Networks," 2015 IEEE 8th International Conference on Cloud Computing, Jun. 27, 2015, pp. 397-404.

\* cited by examiner

REPLICATION IN A CLOUD ENVIRONMENT

CROSS REFERENCE TO RELATED APPLICATION

This application is a 35 U.S.C. § 371 national stage application of PCT International Application No. PCT/EP2019/052264 filed on Jan. 30, 2019, the disclosure and content of which is incorporated by reference herein in its entirety.

TECHNICAL FIELD

The present application relates to a method for operating a replication control module and to a method for operating a data handling module. Furthermore the corresponding replication control module and data handling module are provided. Additionally a computer program and a carrier comprising the computer program, and a system comprising the replication control module and data handling module are provided.

BACKGROUND

With the advent of IoT (Internet of Things) there are new applications emerging (both in the consumer and industrial segments) requiring highly responsive cloud services. Edge computing is a new paradigm in which extra compute resources are co-located with network edge nodes (e.g. base stations or mini data centers). These compute resources can be dynamically allocated to various services/applications, providing very low communication latencies towards mobile devices. Besides the better latency characteristics, another important aspect is the decreased network usage: if it is possible to push down the bandwidth-intensive parts of an application to the edge, it can be avoided to transfer huge amounts of data to a central site for processing. This architectural change is key to making certain applications feasible.

Edge computing will play a critical role in 5G. 5G will provide very low (single digit millisecond) latency for new use-cases, such as industrial control systems, connected vehicles or AR/VR (Augmented Reality/Virtual Reality). One example of such a use-case is a safety service for connected cars, where cars report their location to the closest edge node. There, a service instance determines potentially dangerous situations in the proximity, e.g. when two cars approach the same street intersection with poor sight clearance and sends warnings to the cars accordingly. Another example is collaborative cloud robotics, where sets of fixed and mobile robots are controlled from the cloud to work together as a whole. This new paradigm may bring huge benefits for factories: higher flexibility and adaptivity in work scheduling, easier reconfiguration of production chains, better understanding and optimization of the manufacturing process via analytics, etc. However, it also poses great challenges on the cloud environment, as the robots usually require tight (10 milliseconds or faster) feedback/control loops.

A major requirement for such services is that they should function reliably, even when there are changes in the traffic flow. Most notably, when devices are in motion, handovers should work seamlessly not only on the level of raw connectivity, but also on the level of service experience/requirements too, i.e. the service latency should not increase above a predefined threshold. On the other hand, services should survive routing changes due to the inevitable failures in the infrastructure (e.g. a failure of a blade in the edge).

In the literature, it has been extensively studied how to design reliable computer systems (see e.g. Kleppmann, Martin. Designing Data-Intensive Applications: The Big Ideas Behind Reliable, Scalable, and Maintainable Systems. "O'Reilly Media, Inc.", 2017). Most of the known techniques involve distributing the application to multiple nodes and applying some form of replication to provide fault tolerance. In general, it can be said that these traditional solutions do not take into account latency/bandwidth constraints for the localization of services, nor do they handle the mobility of service consumers.

Other proposals do focus on the handling of mobility in a distributed cloud environment, with multiple central sites. The authors Taleb, T., & Ksentini, A. (2013). Follow me cloud: interworking federated clouds and distributed mobile networks. IEEE Network, 27(5), 12-19 describe the concept of Follow me cloud, which enables mobile cloud services to follow their respective mobile users during their journeys by migrating all or portions of services to the optimal DC (Data Center) to ensure the best Quality of Experience. The presented method extends the handover logic both on the UE (User Equipment) and the DC side to enable service mobility. In particular, IP addressing is replaced by a new service identification scheme, and thus session mobility is decoupled form layer 2 and 3 mobility. This enables service continuity even if the IP address of the UE/application server changes (e.g. during a handover). While this concept is very much related to the fundamental goals of edge-cloud, it is reactive in nature and does not match the latency goals of 5G.

Farris, Ivan, et al. "Providing ultra-short latency to user-centric 5G applications at the mobile network edge." Transactions on Emerging Telecommunications Technologies (2017), Farris, Ivan, et al. "Lightweight service replication for ultra-short latency applications in mobile edge networks." IEEE 201 (2017): 2017, and Farris, Ivan, et al. "Optimizing service replication for mobile delay-sensitive applications in 5g edge network." IEEE 201 (2017): 2017 investigate the problem of fast service relocation specifically in the context of edge cloud and 5G. Their approach is focused on the management and orchestration of containerized microservices: they apply proactive container image provisioning and scheduling in order to reduce service (i.e. container) migration time upon a handover. They propose a container synchronization procedure for transferring the service when user mobility requires so. This procedure involves a downtime period when neither the handover source, nor the handover target container is able to serve user traffic. This implies service disruption times in the range of seconds, or tens of seconds and is thus not suitable for latency sensitive edge cloud scenarios.

Their proposed synchronization technique is built on top of rsync and lsyncd, which are executed in the context of a filesystem (or data volume in Docker). This means that the solution can mirror entire files only, not individual data elements or states, and in practice, can be run at most every few seconds. A consequence is that a single container failure can lead to losing at least a few seconds of state updates, which may render the affected sessions defunct.

In summary, the service migration and orchestration mechanisms known in the art are vital to enable mobility for edge cloud applications but are not sufficient to support truly latency sensitive scenarios, where regular multi-second downtimes are unacceptable.

SUMMARY

Accordingly a need exists to overcome the above-mentioned problems and to improve the latency in case of handover of a data session from a serving application instance to a target application instance.

This need is met by the features of the independent claims. Further aspects are described in the dependent claims.

According to a first aspect a method for operating a replication control module is provided wherein it is determined that a handover takes place by which a data session exchange via a cellular network between a serving application instance and the user equipment is transferred from the serving application instance to a target application instance selected from a plurality of application instances located in a cloud environment. Session state data of the data session comprise a session state of the data session. Furthermore a location of the target instance in the cloud environment is determined and the target replica locations of replica of the session state data are determined on a per session basis for said data session taking into account the location of the target application instance. The replica comprises a master replica and at least one slave replica and the target replica location is determined for the master replica and the at least one slave replica. Furthermore, location information is transmitted to a data handling module allowing the data handling module to distribute the replica to the determined locations of the target replica locations.

In the above described method the data replication of the session state data is carried out in a location aware manner as the target location is individually determined for each session, and by taking into account the location of the target application instance after the handover the positions in the cloud environment of the session state data can be determined accordingly. Accordingly the likelihood that in case of a handover the important information needed to continue the data session (i.e. the session state data) is already present at the target application instance is increased, as the likelihood is higher that at least one of the slave replicas is provided for this session already at the location of the target application instance.

Furthermore the corresponding replication control entity is provided comprising a memory and at least one processing unit, wherein the memory contains instructions executable by the at least one processing unit and wherein the replication control module is operative to work as discussed above or as described in further detail below.

Alternatively a replication control module is provided comprising a first module configured to determine that the handover will take place by which the data session is transferred from the serving application instance to the target application instance selected from the plurality of application instances located in the cloud environment. A second module of the replication control module is configured to determine a location of the target application instance in the cloud environment, and a third module is configured to determine the target replica locations of replica of the session state data individually on a per session basis for said data session taking into account the location of the target application instance. The replica comprises a master replica and at least one slave replica and the target replica location is determined for the master replica and the at least one slave replica. A fourth module of the replication control module is configured to transmit the location information to a data handling module allowing the data handling module to distribute the replica to the determined locations of the target replica locations.

Furthermore a method for operating a data handling module is provided wherein the target replica locations of the replica of session state data are determined individually on a per session basis for a data session exchanged via a cellular network between a serving application instance and the user equipment, wherein the data session is handed over from the serving application instance to a target application instance selected from a plurality of application instances located in a cloud environment, wherein the session state data comprise a session state of the data session and the replica comprise a master replica and at least one slave replica and the target replica location is determined for the master replica and the at least one slave replica. Based on the determined target replica locations the data handling module distributes the replica of the session state to the determined replica target locations.

The data handling module can thus implement the distribution of the replica to the determined locations as provided by the replication control module and can assure that in case of a handover the data needed to continue the data session is already provided at the location of the target application instance with a high likelihood. Accordingly the time needed to transfer the required data is avoided in most of the cases.

Furthermore the corresponding data handling module is provided comprising a memory and at least one processing unit wherein the memory contains instructions executable by the at least one processing unit. The data handling module is operative to work as discussed above or as discussed in further detail below.

In an alternative a data handling module is provided comprising a first module configured to determine target replica locations of replica of session state data individually on a per session basis for a data session exchanged via a cellular network between a serving application instance and a user equipment, wherein the data session is handed over from the serving application instance to a target application instance selected from a plurality of application instances located in the cloud environment and wherein the session state data comprise a session state of the data session. The replica comprises a master replica and at least one slave replica and the target replica locations are determined for the master replica and the at least one slave replica. Furthermore a second module is provided configured to distribute the replica of the session state to the determined target replica locations.

Furthermore a system is provided comprising the replication control module and the data handling module.

Additionally a computer program comprising program code is provided, wherein execution of the program code causes the at least one processing unit to execute a method as discussed or as explained in further detail below. Furthermore a carrier comprising the computer program is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

Other devices, systems, methods and features will become apparent to one with skill in the art upon examination of the following detailed description and figures.

DETAILED DESCRIPTION OF EMBODIMENTS

Figure 1:
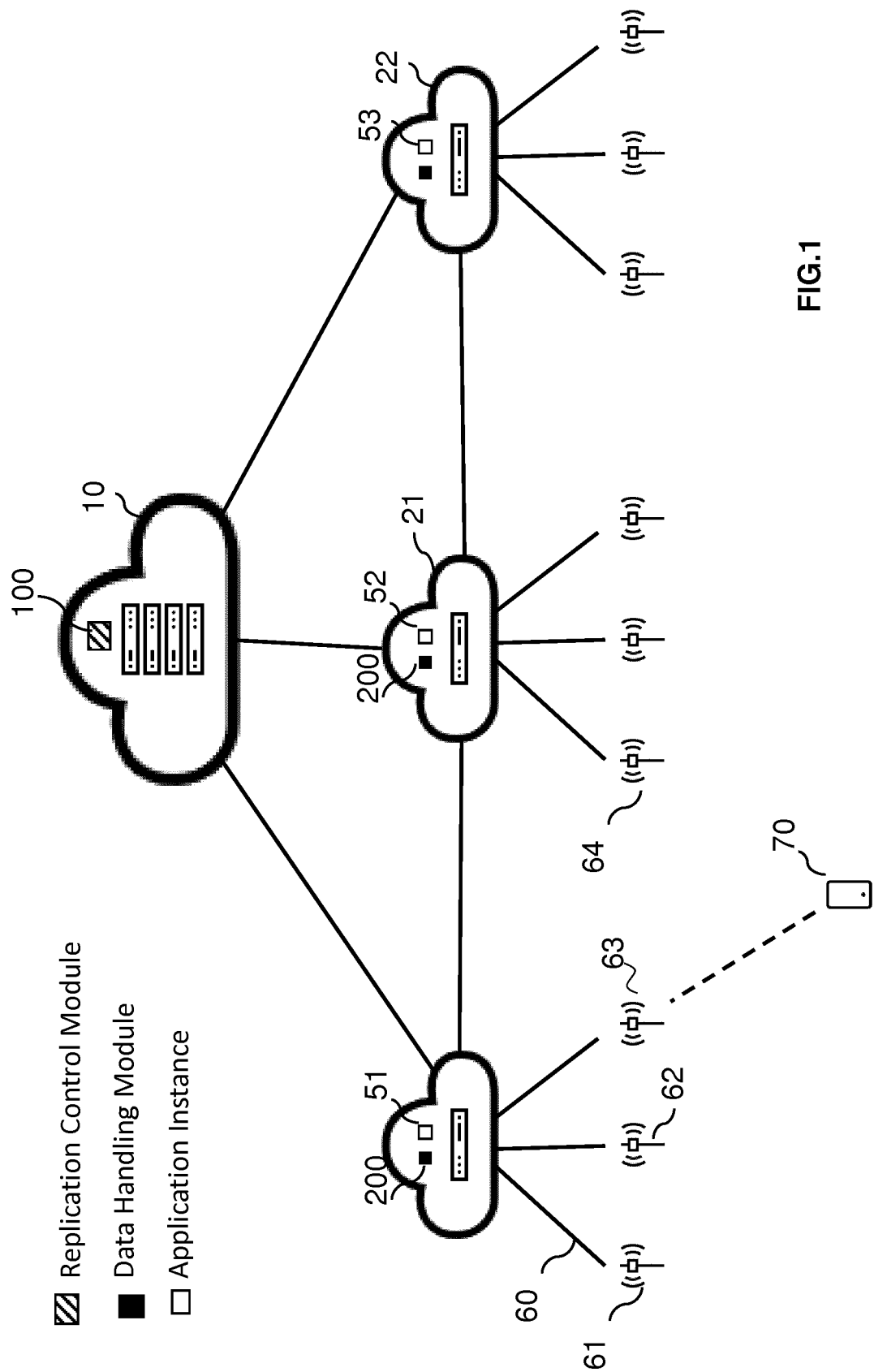
FIG. 1 shows a schematic architectural view of a system in which different application instances are provided in a cloud environment and in which a user equipment is having a data session via a cellular network with an application instance located in the cloud environment.

In the following, embodiments of the invention will be described in detail with reference to the accompanying drawings.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term "mobile entity" or "user equipment" (UE) refers to a device for instance used by a person (i.e. a user) for his or her personal communication. It can be a telephone type of device, for example a telephone or a Session Initiating Protocol (SIP) or Voice over IP (VoIP) phone, cellular telephone, a mobile station, cordless phone, or a personal digital assistant type of device like laptop, notebook, notepad, tablet equipped with a wireless data connection. The UE may also be associated with non-humans like animals, plants, or machines. A UE may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the UE. The presence of a SIM within a UE customizes the UE uniquely with a subscription of the user.

For the sake of clarity, it is noted that there is a difference but also a tight connection between a user and a subscriber. A user gets access to a network by acquiring a subscription to the network and by that becomes a subscriber within the network. The network then recognizes the subscriber (e.g. by IMSI, TMSI or GUTI or the like) and uses the associated subscription to identify related subscriber data. A user is the actual user of the UE, and the user may also be the one owning the subscription, but the user and the owner of the subscription may also be different. E.g. the subscription owner may be the parent, and the actual user of the UE could be a child of that parent.

In the following a system is proposed that allows cloud computing services, especially edge cloud services to achieve reliable and very low latency communication with user equipment, and when these devices are mobile and handovers take place. The system discussed below handles the management of application states, the session state data in a way decoupled from the orchestration and execution of the application. It can be said that it is handled in a layer decoupled from the orchestration and execution of the application. This state handling layer stores the states related to the user session, the session state data, or user context, and takes care of the data replication in a location aware manner so that the replicas for a given data session are always kept geographically near to the user equipment owing the session. In this way, whenever a handover occurs, important application states are already present at the target application instance, by way of example a target edge compute side, so that service disruption times are essentially avoided. The proposed replication method discussed below can also be used to improve the reliability of edge services by employing replication not only between, but within edge sites such as the replication across plates belonging to the same edge node.

FIG. 1 shows a schematic overview over a cloud implemented system with a central cloud side 10 including a replication control module 100 which controls the location of session state data of a data session located at different edge cloud nodes 20, 21 or 22. At each edge cloud node a data handling module 200 can be provided which implements the decisions of the replication control module and takes care of replication master updates to the slave replicas.

Furthermore in each edge node 20 to 22 an application instance such as application instance 51 is provided which provides a service to a user equipment 70 via a cellular network 60. From the cellular network 60 different base stations 61 to 64 are schematically shown.

Figure 2:
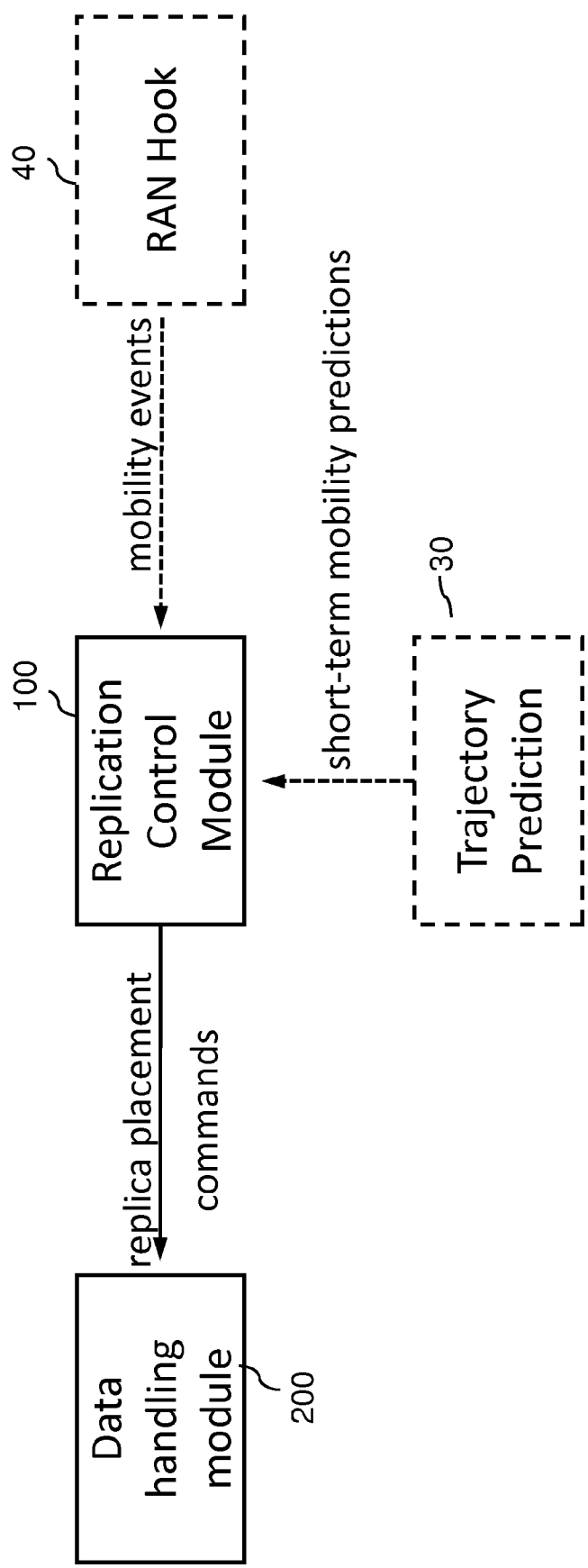
FIG. 2 shows a schematic view of a block diagram of the cooperation between a replication control entity configured to determine the location of a target application instance in case of a handover and a data handling module configured to operate as instructed by the replication control module.

User mobility represents one of the key challenges in achieving a low latency and reliability targets mentioned in the introductory part. When a user moves e.g. from one base station 63 to another base station 64 connected to another edge side or node such as edge node 21, the connectivity may be routinely handed over between the edge nodes so that the application is handed over from a serving application instance 51 to a target application 52 as shown in FIG. 2. Despite the regular switching between serving application instances, the system as shown in FIG. 1 can guarantee that the end users do not experience service disruption or downtime as will be explained below.

To tackle this issue a system is proposed which enables the applications to externalize the session state data or user context, wherein these data are replicated in a location aware manner on a per session basis. When a user equipment 70 is moving to a coverage area of a neighboring edge node, e.g. from node 20 to 21, there is no need to trigger an explicit migration process as the session state data is already present at the new node so that the processing can continue without downtime.

Referring to FIGS. 1 and 2, the system comprises two main components, the replication control module 100 and the data handling module 200. The data handling module 200 handles the application states or session state data and the replication control module 100 decides about the placement of the replicas and instructs the data handling module 200 to execute these decisions. The replication control module 100 maintains a real-time view on a user mobility, e.g. by creating a hook in the mobile network as symbolized by module 40 so that module 100 receives notifications about all the relevant mobility events. By way of example module 40 can hook in the RAN (Radio Access Network) handover procedure. Furthermore a trajectory prediction module 30 can provide information to the replication control module on plausible mobility paths of the user. It should be understood that modules 30 and 40 may also be incorporated into the replication control module 100.

The application instances 51 to 53 can externalize the session state data and store it individually at the different edge nodes, e.g. in a specialized data layer. This storage layer can be thought of as a platform service that provides fast data access and is distributed across all the sites and the nodes of the cloud environment.

For a typical latency sensitive edge cloud service, two basic categories of data can be distinguished that is used by the application. These two broad categories may require different treatment by the edge cloud system.

There are fast-changing states, which are typically of smaller size. These could include user position information, sensor readings (e.g. speed, gear or pedal status for a connected vehicle application or joint positions for a robotic application), various counters, etc. Many of these fast-changing data are related to the session of a single user/entity, so below it is referred to the set of these data as user context or session state data.

On the other hand, there are larger, pseudo-static data sets used by the application, which are typically changing slowly, and are not related to any single user. One example for vehicular applications is the high-definition map which contains all sorts of details beyond the raw road structure, such as curbs and curbs height, or temporary road closures, etc. In the following, it is referred to this type of possibly larger data sets as shared data.

Of course, this division may not perfectly cover all possible cases, e.g. there might exist other types of shared data which are changing fast. Examples include counters or other, more complex correlations derived from live per user data streams. However, in many cases these shared data can be well partitioned and can be handled as a state attached to a single application instance, as opposed to a single user (e.g. a counter for the number of users/robots in a certain area). As such, these states can be co-located with the corresponding application instances, and thus their access times should not induce significant latency spikes during handover events. Other types of data may not be partitioned well (e.g. continuously updated global correlations), but in that case the application has to deal with the remote update latency anyway, regardless of user mobility. All in all, though the above categorization of application states may not be perfect, it is still a useful model to approach the problem of replication in the face of mobility.

Replicating the bulky but slowly changing parts of the data is usually less challenging as traditional tools (e.g. files and rsync/lsyncd, or existing database technologies) can be used, and also, these data sets can frequently be well partitioned and cached. E.g. a connected car application instance in an edge node may be configured to handle only a certain spatial area in the vicinity of the edge node, and thus cache only the relevant portion of the high-definition map. Moreover, the infrequent updates to the map can be applied in the background, without interference with ongoing user sessions.

Besides data storage and retrieval the data handling module 200 can also be responsible for replicating the data elements/session state data within the infrastructure. The replication scheme discussed below may apply to the fast changing session state data discussed above. Contrary to a well-known master slave replication scheme, where each master database node has a respective slave database node acting as replica, the data handling module 200 can control the replica locations on a per data session basis. This means that the replication topology is not hardwired in advance but is adjusted very flexibly during runtime.

Figure 3:
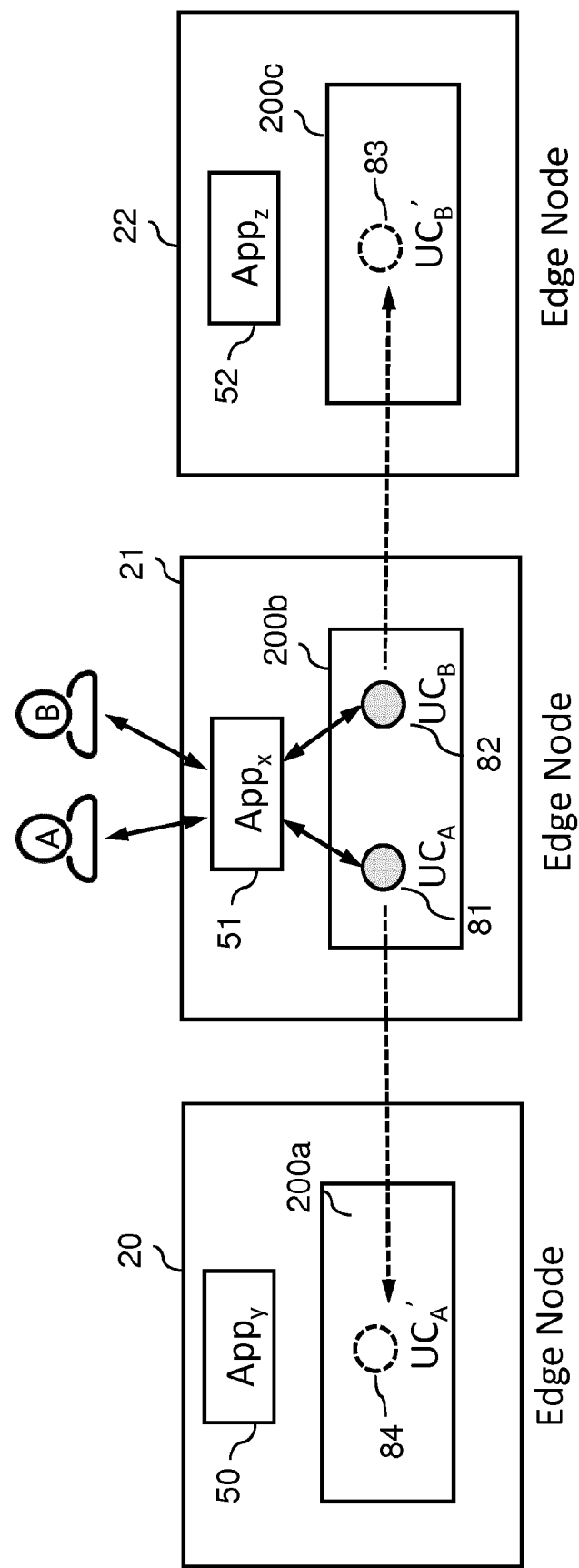
FIG. 3 shows a more detailed view of the location of application instances and the control of the replica of the session state data needed for keeping a data session working.

This is illustrated in the following examples of two users, user A and B as shown in FIG. 3 which use the same service from the same geographical location and which are served by the same application instance 51 shown in FIG. 3. The application externalizes the session state data for the sessions of user A and user B into master session state data, a master replica 81 and master replica 82 for user B. The master replica are stored collocated with the serving application instance. As shown in FIG. 3 it is possible in such a situation that the replicas, namely the slave replicas are stored on different nodes. In the embodiment shown the slave replica 83 for user B is stored on node 22 wherein the slave replica 84 for user A is stored on node 20. More generally the master data or master replica corresponding to different user sessions can be replicated to different sets of nodes, possibly with differing cardinality.

This location control capability has different benefits. First of all it can be made sure that the master replica is always collocated with the serving application instance. In this way the data access latency can be drastically reduced, thus mitigating the overhead of externalization of the session state data from the application.

Secondly when in case of a handover the user is served by a different application instance, the corresponding session state data needed to continue the data session is already replicated to the corresponding data handling module or node. There is no need to request a transfer of the session state data at all, and the processing can go on without downtime. If the session state data is not present at the new location after the handover, the data handling module 200 can initiate the transfer of the session state data upon the first access from the new application instance taking over the data session, called target application instance hereinafter. This extra step may cause some minor service interruption depending on the round-trip time between the new and old data handling modules and the size of the session state data such as the user context. However, if an application does not tolerate these transfers during hand overs, the situation can be avoided in that the session state data is proactively replicated to all possible new locations, e.g. the locations in the direct neighborhood as controlled by the replication control module 100.

The data handling module 200 provides an interface on which the replication control module 100 can adjust the replication on a per session basis. The interface can provide primitives for setting a master flag for user context replica stored in a certain data handling module 200 and for adjusting the set of nodes to where a given session state data should be replicated.

Figure 4:
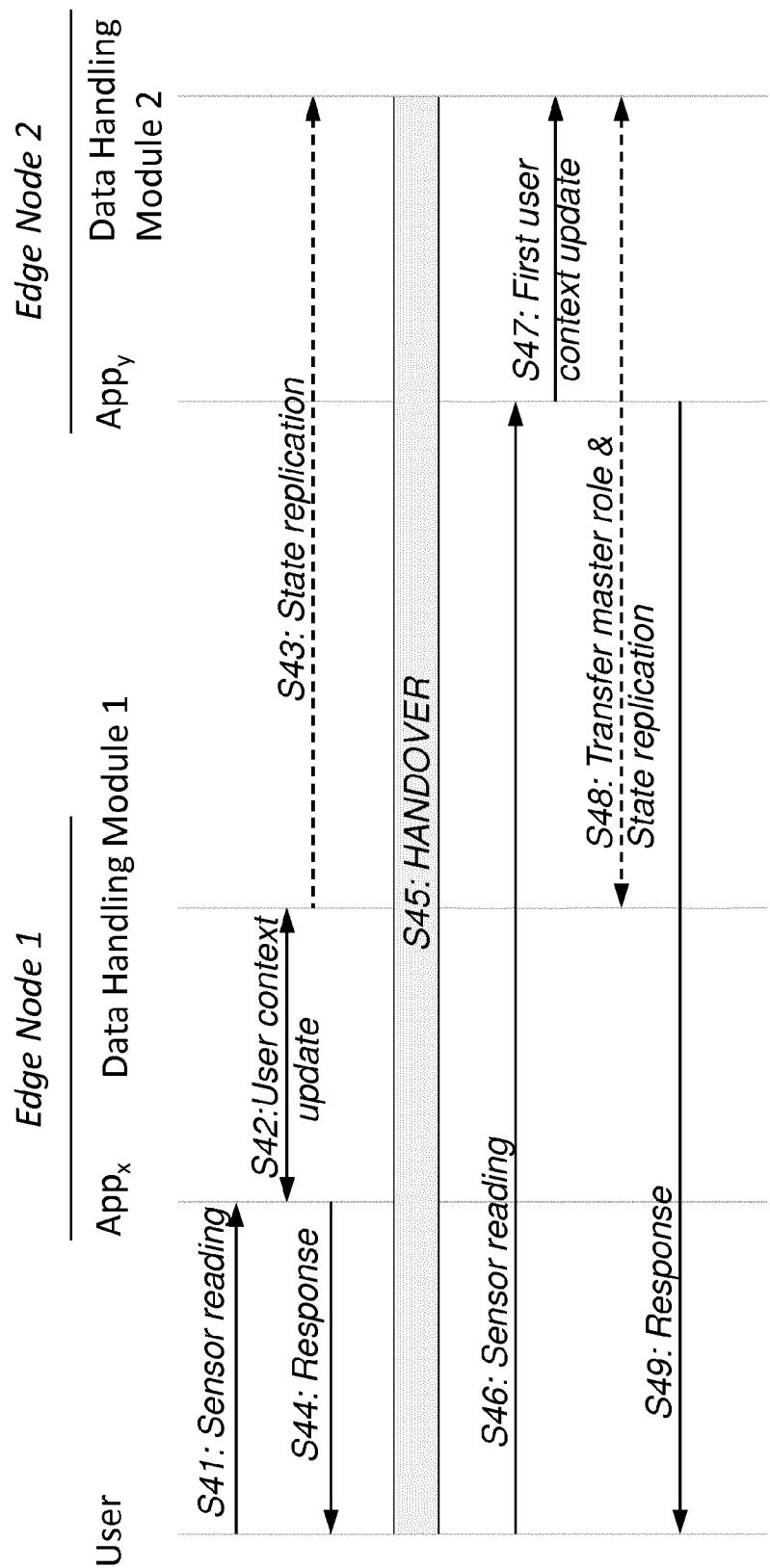
FIG. 4 shows a schematic view of a message exchange between the entities involved in a handover of a data session.

An example of a message exchange during an ongoing session is shown in FIG. 4. In the example shown the application module comprises a sensor reading as carried out by the user equipment 70 which is sent to the application instance. In step S41 a sensor reading is transmitted from the user equipment to the application. In the example shown the session state data is implemented as user context so that in step S42 a user context update is carried out in data handling module 1 which stores the master replica. In step S43 the other data handling module, data handling 2 is informed of the update so that the slave replica on data handling module 2 is updated. The dashed line arrow of step S43 indicates control plane messaging.

In step S45 a handover takes place so that in step S46 the sensor reading data is now transmitted to the other application provided on the other node which now takes over the role of the master replica. The sensor reading is updated so that the context is updated in step S47. In step S48 the master role and the replication of the session state data is exchanged between data handling module 1 and data handling module 2 and a response is transmitted back to the user equipment in step S49.

Figure 5:
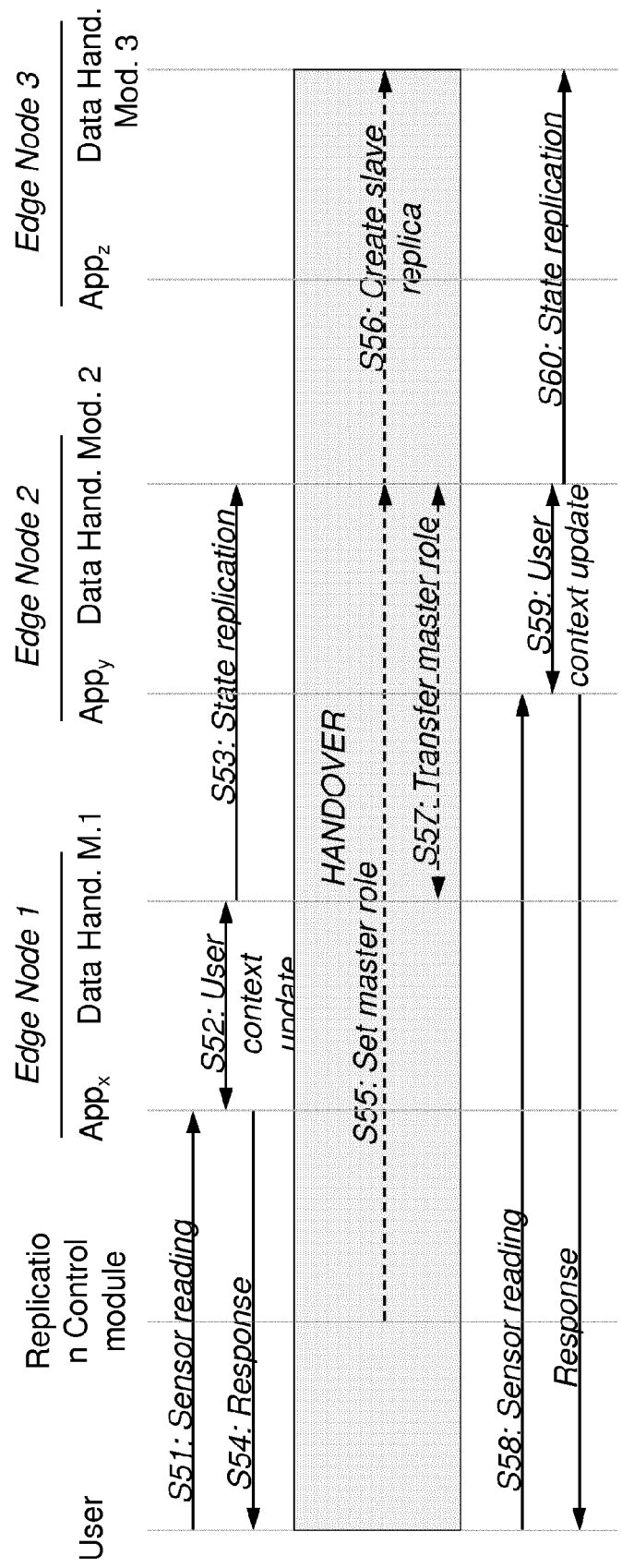
FIG. 5 shows another schematic view of a message exchange between the entities involved in a handover of a data session.

FIG. 5 shows a more detailed view of the involved nodes with new locations of the master replica and at least one slave replica storing the session state data. In the example below the user context is given as session state data, however it should be understood that FIG. 5 also applies in general when the session state data is updated instead of the user context. In step S51 sensor data is transmitted from the user equipment 70 to one application instance, wherein the master replica is updated which is located in the same node in step S52 so that updated user context or session state data is present after step S52. The slave replica located at another node is updated so that the session state data is transmitted with an update to the other data handling module in step S53. In step S54 a response is transmitted back from the serving application instance to the user equipment 70.

As the user equipment moves to a new location a handover takes place so that the replication control module determines in step S55 that the master role should be changed. As part of the handover procedure the replication control module 100 can set up a master flag for the user context in the new data handling module which in turn transfers the master role from the old location to the new location. In parallel to this the replication control module also instructs a third data handling module located at another node to instantiate a slave replica for the user context. The third data handling module may be located ahead on the presumed trajectory of the user equipment.

Accordingly the master role is transferred from one data handling module to the other in step S57. Accordingly in step S58 the sensor reading is now transmitted to the new serving application instance and the user context is updated in step S59. The user context information is updated in step S60 to the newly created slave replica and in step S61 a response is sent back to the user equipment.

The method described above is not limited to handovers due to a mobility, but can be also used for improving the reliability. By way of example in case of a physical node such as a blade or a failure of a virtual module, the very same mechanism can be applied. When the failure is detected quickly, the affected user traffic can be transferred to another healthy data handling module. If the slave replicas for the master replica were lost during the failure and are already present at those locations, as discussed above, no state transfer needs to be performed and the service disruption can be minimized for the affected users. Otherwise the user context needs to be copied from another still available replica. In both cases a new master replica has to be selected which should be the one collocated with the new application instance getting the user traffic. This might be implemented via a multicast message from the local data handling module to all other data handling modules holding a copy of the session state data.

After the master role has been transferred in step S57 the sensor data is sent by the user in step S58 to the new application instance which took over the role of the serving application instance after the handover. In step S59 the user context is updated in the new master replica and in step S60 the data is updated in the slave replica stored in node 3. Finally a response is sent back to the user in step S61.

The system discussed above leverages the fact that the given user is always connected to a single service application instance at a given point in time. Accordingly the handling of user contexts or session state data conforms with the single writer principal, meaning that there are no session state data stored in one of the data handling modules that are concurrently written by multiple application instances. Accordingly, it is a viable strategy to always select the master copy, the master replica, to be the one collocated with the application instance serving the user. In case of a handover the serving application instance is changed, so that the master role for the corresponding session state data also needs to be transferred as discussed above in connection with FIGS. 4 and 5. In case there is no local copy of the session state data, the system initiates a copy with the transfer of the master role.

To guarantee that different copies of the same data do not diverge, the data handling module can accept write commands only for the master copy, slave copies can only be read. To prevent data corruption stemming from concurrent writes of the master replica, the data handling module may use optimistic concurrency control.

As discussed above shared data may require different treatments, but it is usually a good approach to try to partition the data so that the number of concurrent writes by multiple applications or instances is minimized. By way of example in case of a global counter, the write accesses may be accumulated locally and only periodically the local counter is flushed into the global value.

The session state data may be replicated asynchronously meaning that the application may or may not wait until the data handling module finishes the replication of a data update. This does not pose any practical indication on the system; although in certain failure cases some user context updates may be lost, the edge application is anyway a single point of failure from the perspective of the user sessions they handle. The applications can also configure certain data elements to be replicated synchronously, thus achieving a stronger guarantee on consistency at the price of decreased right latency.

In the following the replication control module 100 is discussed in more detail.

The main responsibility of the replication control module is to continuously adjust the replication configuration for the session state data stored in the data handling modules. The replication control module 100 collects information about the user mobility in real time, by way of example from the 5G course AMF (mobility management function) or a central real-time analytics entity. The replication control module 100 can furthermore take into account predicted trajectories for mobile users. Based on these individual histories, at every handover event the module recalculates the optimal set of replica for the given user and sends the replication control commands to the data handling modules 200 accordingly.

The application control module 100 preferably has a detailed knowledge about both the cell topology of the cellular network and how cells are interconnected with the edge computing nodes 20 to 22. When the user is approaching a coverage boundary between two edge nodes, the replication control module 100 can instruct the data handling module 200 to proactively prepare a new slave replica or to move an existing replica to the neighboring edge node.

With this solution it is possible to fine control the latency requirements needed for different services based on the specific requirements. One aspect is the number of replications provided on neighboring nodes such as the replication factor. There can be multiple strategies to perform the replica placement calculation. If a certain latency sensitive service requires zero mobility induced disruption, the replication control module 100 can use a strategy which ensures that a replica is always present in all neighboring edge nodes. In the extreme case of a very dense edge cloud deployment, where edge compute nodes are collocated with base stations, this would mean that the user context or session state data for a user equipment would literally follow the user in space as a replica cloud.

Figure 6:
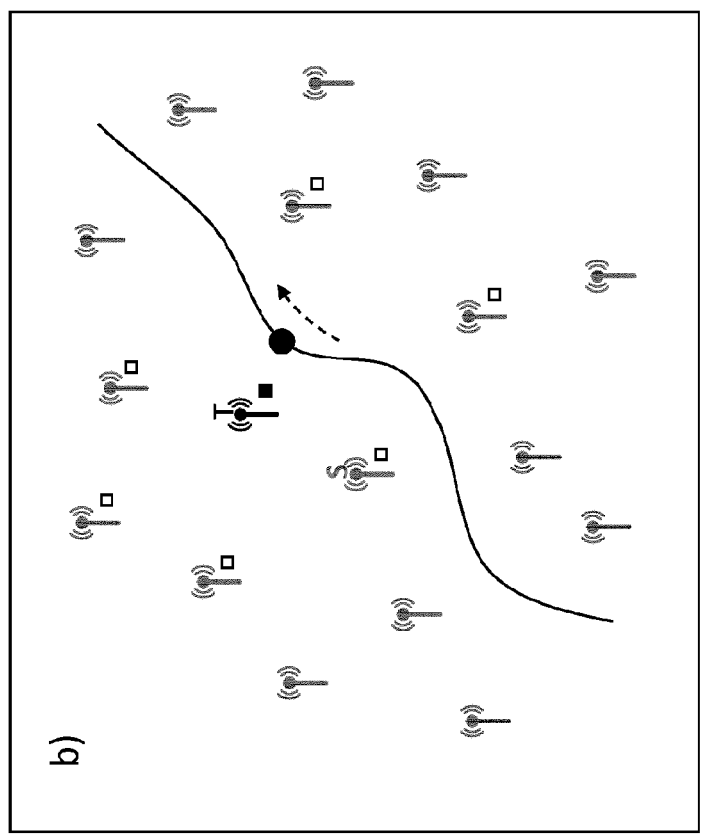
FIG. 6 shows a schematic view of a handover of a data session to a target application instance wherein replicas are provided at all neighboring nodes.
Figure 6:
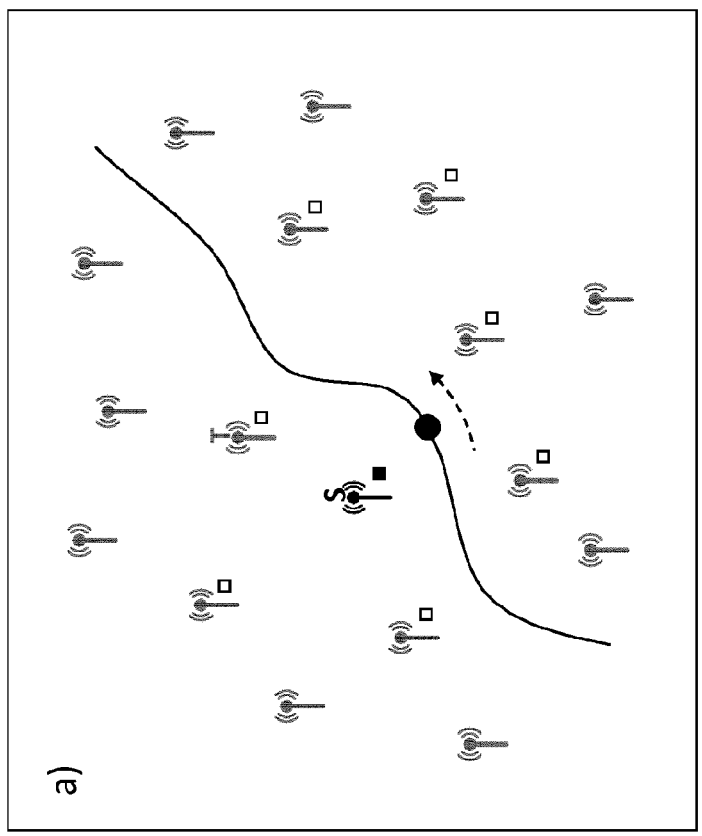

Such an example is shown in FIG. 6. In FIG. 6 the mobile entity 70 is moving along a path 71 as shown in FIG. 6A. Due to the mobility a handover will take place from base station S to base station T. The node in black represents the one serving the user equipment 70 and the solid square denotes the master replica wherein the unfilled squares describe the slave replicas. As shown in FIG. 6A each node which is a direct neighbor to the present serving application instance comprises one of the replicas. Accordingly in the case of the handover to base station T as shown in FIG. 6B the replica is already present at this node so that only the role of the master has to be transferred.

Obviously the embodiment of FIG. 6 might lead to a large resource footprint and there might be higher costs associated with such a strategy. In the same infrastructure another application may require lesser guarantees with less cost. As an alternative, it is also possible to rely more on the trajectory of the user equipment and to predict a few probable next locations for the user.

Figure 7:
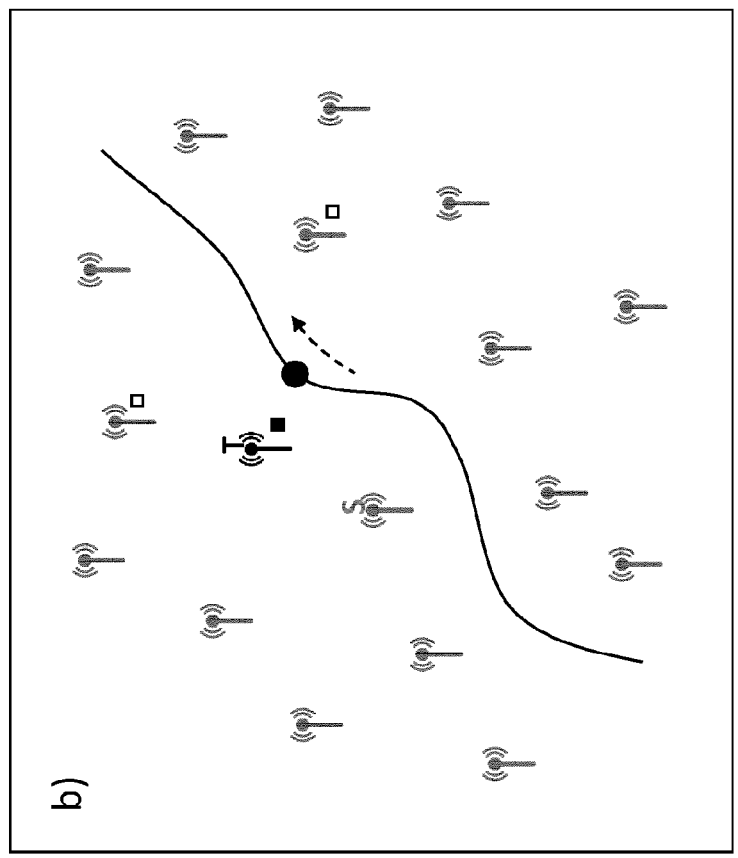
FIG. 7 shows a schematic view of a handover of a data session from a serving to a target application instance taking into account a moving direction of the user equipment.
Figure 7:
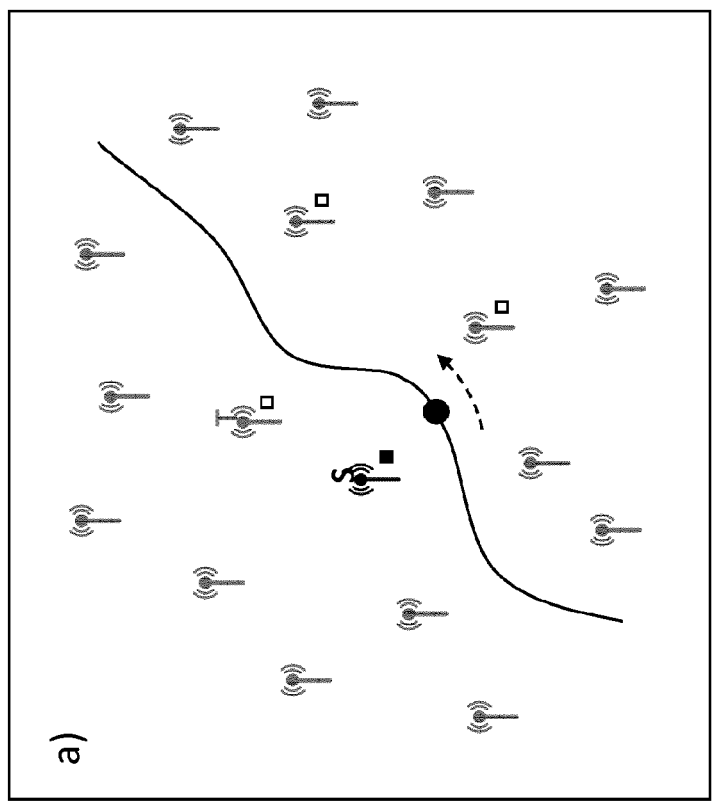

This situation is shown in FIG. 7 where the session state data are only replicated to those limited number of locations which are located close to the predicted route. FIG. 7A shows the situation with S being the serving base station comprising the serving application instance. A handover will take place to base station T. The solid square denotes the master replica and the unfilled squares describe the slave replicas. As shown in FIG. 7B the slave replicas may only be present in the neighboring nodes which are located in direction of the movement.

Summarizing the customizable nature of the replica placement strategy can create a means to control the trade-off between the level of latency guarantees and the amount of resources used.

The success of the replication placement strategy can depend on how well the replication control module 100 is able to predict the next location of the mobile user equipment. In dense deployments where the coverage area of a given edge node is limited, instabilities and mis-predictions may occur more frequently due to the variability in the handover patterns, the vast diversity of urban territories, ping-pong effects, etc. The system can also be configured to collect historic data for different users and to learn the handover patterns and to take into account historical moving data of the user equipment of the same user or of other users located at the same location. The handover patterns can then be learnt and it is possible to weight different nodes with a probability indicating a probability that the user will use this node and this application instance as next serving node.

The learning can be performed on two levels. First the application control module builds profiles of individual users so that recurring mobility patterns can be used to help in the decision-making. By way of example if a mobile user travels the same route every weekday morning and evening, this information can be used to predict the territory with a higher confidence level. The system may also learn from global patterns and handovers, that can include features such as network load, interference, etc. This can help inferring typical handover behavior, as a function of the network status. To this end the application control module can reach out to the trajectory planning functionality to get a hint on probable user trajectories.

Figure 8:
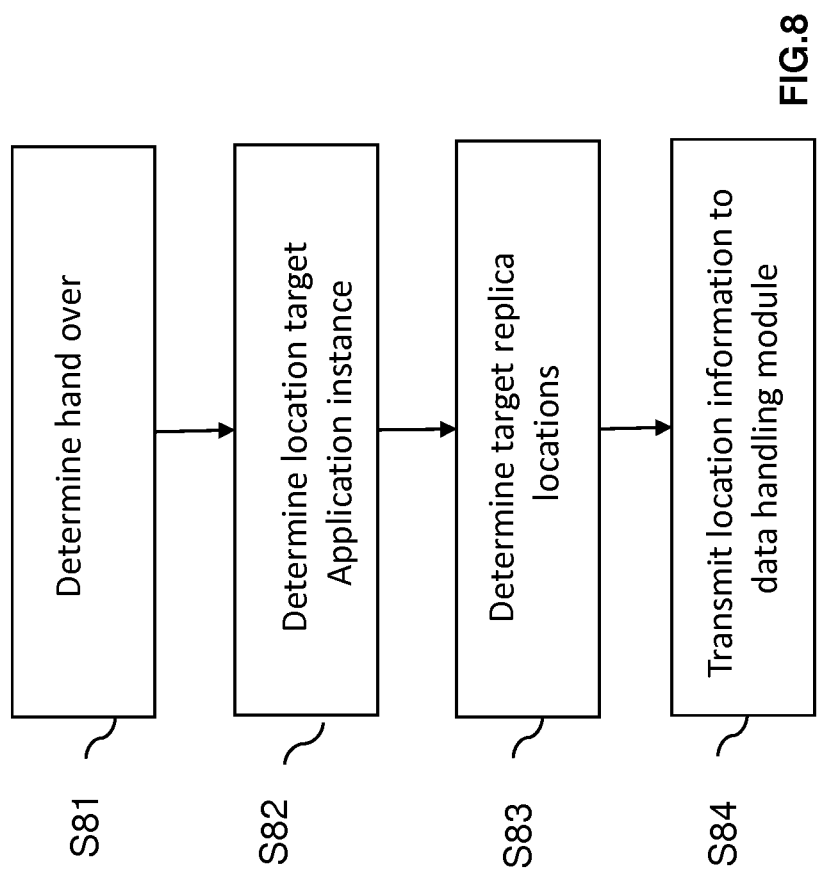
FIG. 8 shows an example flowchart of a method carried out by the replication control module for assuring a handover of a data session with a low latency.

FIG. 8 summarizes some of the steps carried out by the replication control module 100 in the above discussed method. In step S81 the replication control module determines that a handover takes place from a serving to a target application instance. As mentioned above this information can be received from the mobile network and a trigger informing the module 100 of every handover procedure. In step S82 the location of the target application instance is determined in the cloud environment. When the target application instance is known it is possible to determine the target replica locations in step S83 for the master replica and the at least one slave replica. As discussed above in connection with FIGS. 6 and 7 different options exist to determine at which edge nodes the slave replicas of the master should be located. Depending on the required latency the number of nodes in the direct neighborhood of the serving application instance and which comprise a replica of the session state data can be determined. In step S84 the location information about the different locations for the replica locations is transmitted to the data handling module 200 which distributes the replica as instructed.

Figure 9:
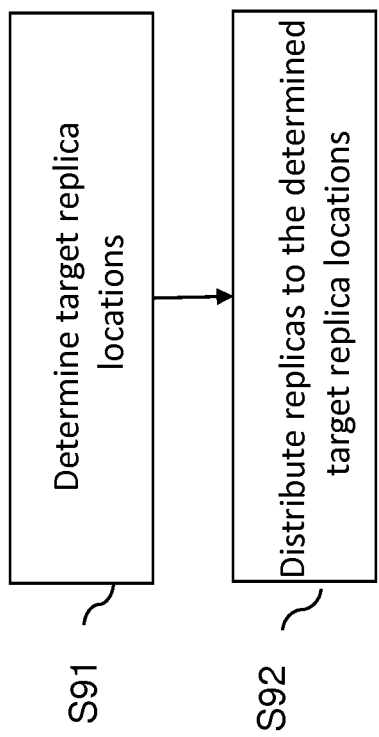
FIG. 9 shows an example flowchart of a method carried out by a data handling module distributing the replicas to the determined target replica locations.

FIG. 9 shows a schematic view of a flowchart carried out by the data handling module 200. In step S91 the data handling module determines the target replica locations of the session state data as received from the replication control module 100. In step S92 it distributes the replica of the session state data to the determined target replica locations.

Figure 10:
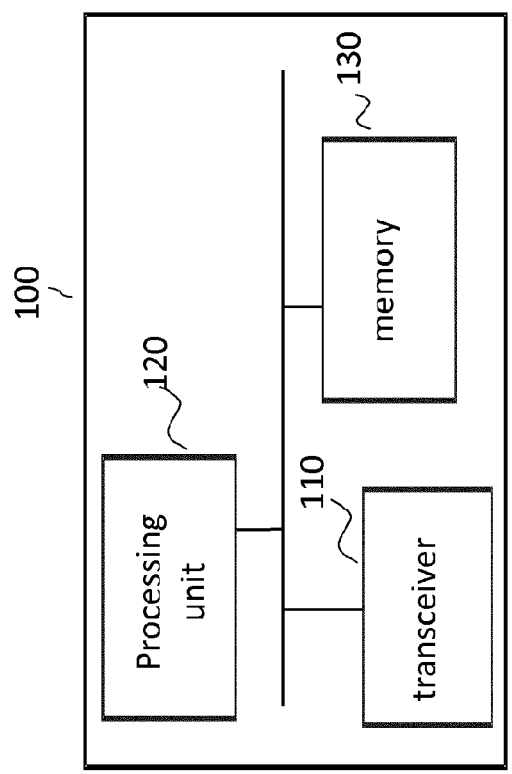
FIG. 10 shows an example schematic representation of a replication control module as used in the system as shown in FIGS. 1 and 2.

FIG. 10 shows a schematic architectural view of the replication control module which can carry out the above discussed control of the locations of the session state data. The module 100 comprises an interface or transceiver 110 configured to transmit user data or control messages to other entities and other nodes and to receive user data or control messages from other nodes. The interface 110 can be used to receive the information about the handover, can receive the information about the projected trajectory of the user, etc. Furthermore the interface can be used to transmit the determined location to the data handling module 200. The module furthermore comprises a processing unit 120 which is responsible for the operation of the replication control module. The processing unit 120 comprises one or more processors and can carry out instructions stored on a memory 130, wherein the memory may include a read-only memory, a random access memory, a mass storage, a hard disk or the like. The memory can furthermore include a suitable program code to be executed by the processing unit 120 so as to implement the above described functionalities of the replication control module.

Figure 11:
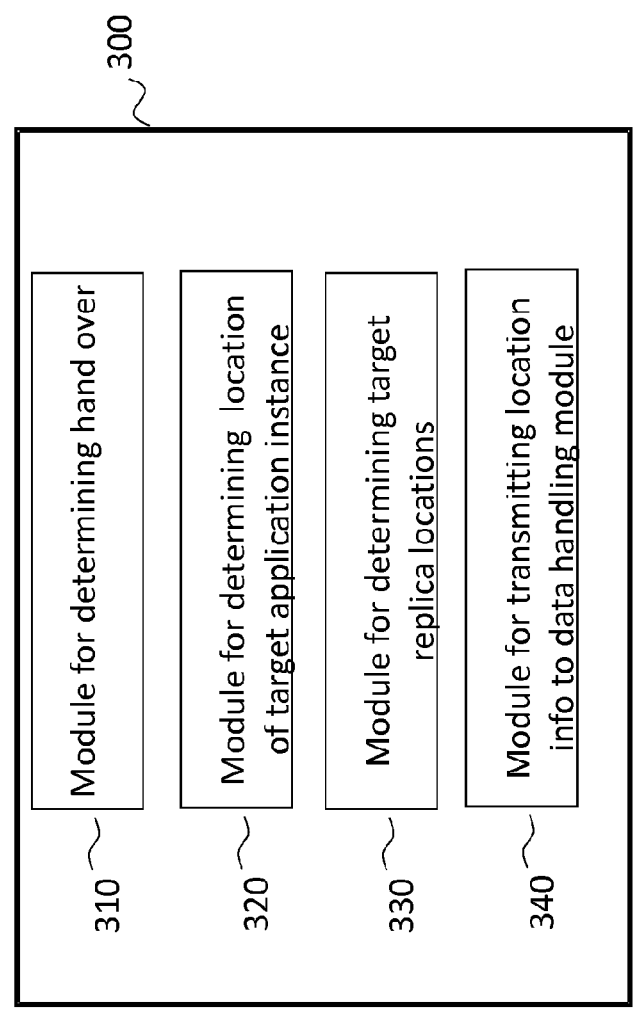
FIG. 11 shows another example schematic representation of a replication control module used in the system of FIGS. 1 and 2.

FIG. 11 shows another schematic view of a replication control module 300 comprising a first module 310 configured to determining that a handover takes place from the serving application instance to a target application instance. The module furthermore comprises a second module 320 configured to determine the location of the target application instance in the cloud environment. Module 330 is provided configured for determining the target locations of the replica of the session state data individually on a per session basis, e.g. by taking into account the trajectory of the user equipment. Module 340 is provided configured to transmit the determined location to the data handling module.

Figure 12:
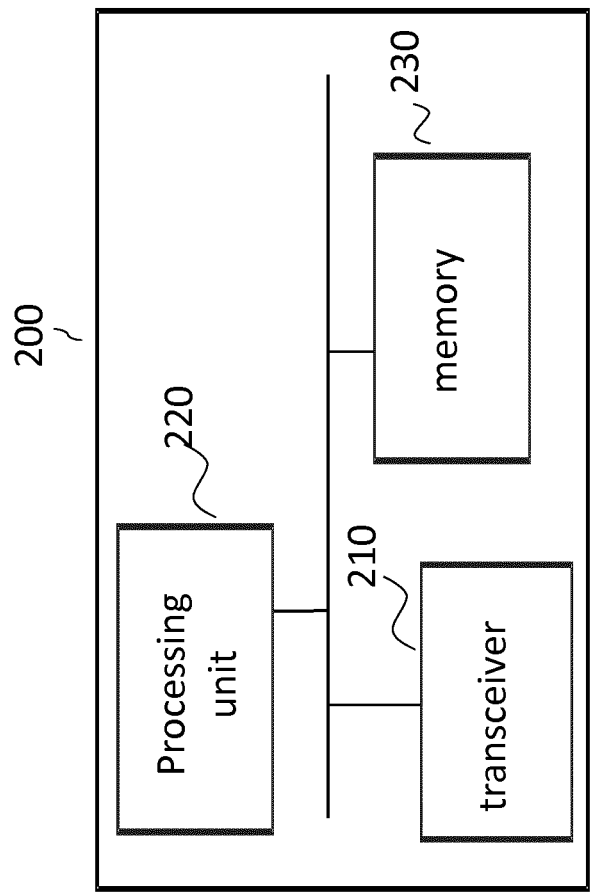
FIG. 12 shows an example schematic representation of a data handling module configured to distribute the replica to determined locations.
Figure 13:
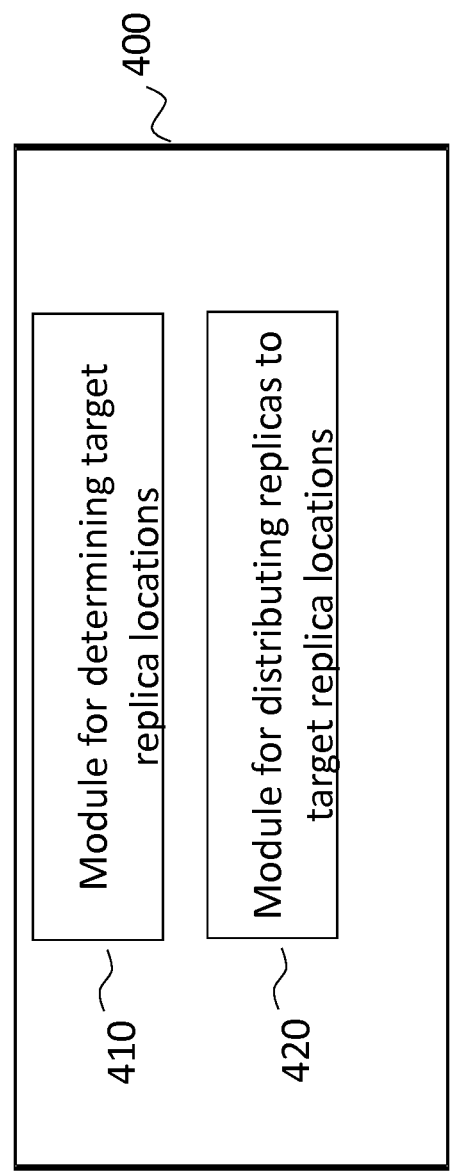
FIG. 13 shows another example schematic representation of a data handling module configured to distribute the replicas to the determined target replica locations.

FIG. 12 shows an example schematic architectural view of the data handling module 200 which can distribute the replicas as discussed above. The data handling module 200 comprises an interface 210 configured to transmit control messages or user data to other entities or nodes and configured to receive user data or control messages from other nodes. The interface 210 is especially configured to receive the instructions from the control module 100 where to locate the replicas of the session state data. The data handling module 200 furthermore comprises a processing unit 220 which is responsible for the operation of the module 200. The processing unit 220 comprises one or more processors and can carry out instructions stored on a memory 230, wherein the memory may include a read-only memory, a random access memory, a mass storage, a hard disk or the like. The memory can furthermore include suitable program code to be executed by the processing unit 220 so as to implement the above described functionalities in which the data handling module is involved.

From the above said some general conclusions can be drawn for the different entities involved, the replication control module 100 and the data handling module 200.

As far as the replication control module 100 is concerned, each time a handover is determined, the target locations may be determined for the master replica and the at least one slave replica.

Furthermore, the location of the master replica may be determined to be located at a first node of the cloud environment which is located as close as possible to the serving application instance. In other words, the master replica is located such that it is located closer to the serving application instance than any of the slave replicas. The location of the at least one slave replica is determined to be located at at least one second node which is a direct neighbor to the first node in the cloud environment.

Furthermore, it is possible to determine a latency requirement of the data session, wherein the number of slave replicas to be distributed to the at least one second node is determined taking into account the determined latency requirement. As discussed above if a low latency is needed, more slave replicas may be distributed over the cloud environment, by way of example in each direct neighboring node to the serving application instance. In another example the number of slave replicas is determined taking into account the trajectory of the moving user equipment.

The location of the at least one second node comprising the slave replica may be determined such that the at least one second node is a direct neighbor of the predicted trajectory.

Furthermore it is possible that the replication control module 100 informs one of the slave replicas stored at the target location of the target application instance to take over the role of the master replica for the target application instance. Furthermore a new location of an additional slave replica is determined taking into account the target location of said one slave replica taking over the role of the master replica. As discussed above in connection with FIGS. 5, 6, and 7 the position of the slave replicas are determined such that the position of the new master replica is considered.

It is possible to determine a mobility of the user including a direction of the mobility wherein the location of the target replica locations is determined taking into account the determined mobility with the direction of movement.

Here it can be detected when a user equipment coming from a first geographical area approaches a coverage boundary leading to a second geographical area where the data session will be controlled by the target application instance. When it is detected that the user equipment approaches the coverage boundary, it is determined to locate the at least one slave replica at a node of the cloud environment located in the second geographical area.

Furthermore, the target replica locations for the master and at least one slave can be determined based on the knowledge about the topology of the cloud environment and the topology of the cellular network.

As far as the data handling module is concerned, when the target replica locations are determined, the information is received from the replication control module and the information about the target replica locations are deduced from the received location information received from the replication control module 100.

Furthermore, the location of the master replica is determined to be located at a first node of the cloud environment which is located as close as possible to the serving application instance. The location of the at least one slave replica is then determined to be located at at least one second node located in a direct neighborhood to the first node in the cloud environment.

When a handover from the serving to the target application instance is detected, it is checked whether at a target node in the cloud environment, where the target application instance is located one of the slave replicas is already present at the target location. If this is not the case, a transfer of the session state data to the target node is initiated.

Furthermore, when an amendment to the session state data stored in the replica is requested, it is checked whether the replica for which the amendment is requested is a master replica. The amendment is only allowed for the master replica and is not allowed for the at least one slave replica. This means that a write access is only allowed for the master replica and not for the slave replicas. Furthermore, when an amendment of the session state data in the master replica is detected, the amendment is directly replicated to the at least one slave replica upon detection of the amendment.

Furthermore, the application instances are located on edge nodes of the cloud environment.

The session state data can comprise a faster changing content and a slower changing content (or pseudo static content) in which the content of the session state data is updated less frequently than in the fast changing content. The discussion above can only relate to the fast changing content.

Summarizing, the above discussed application provides a mobility of a replication method for achieving a stable low latency communication for edge cloud services. The system discussed above handles the session state data related to user sessions in a dedicated layer and then replicates these data to multiple edge locations. This is done in a locality aware fashion so that the replicas are always placed in geographic proximity to the corresponding user. In this way, whenever a handover occurs, important applications states are already present at the target edge computing site, so that service downtimes are essentially eliminated.

The invention claimed is:

1. A method for operating a replication control component, the method comprising:
   collecting information about mobility of a user equipment;
   determining, based on the information, that a handover takes place by which a data session exchanged via a cellular network between a serving application instance and the user equipment is transferred from the serving application instance to a target application instance selected from a plurality of application instances located in a cloud environment, wherein the data session comprises session state data;
   determining a location of the target application instance in the cloud environment;
   determining target replica locations of replica of the session state data individually on a per session basis for said data session during its runtime taking into account the location of the target application instance, wherein the replica comprises a master replica and at least one slave replica and the target replica locations are determined for the master replica and the at least one slave replica;
   predicting a trajectory of the user equipment;
   determining the target replica location of the master replica that is collocated at a first node as close as possible to the serving application instance taking into account the projected trajectory;
   determining the target replica location of the at least one slave replica that is located in at least one second node which is a direct neighbor of the first node; and
   transmitting, to a data handling component, the target replica location information and an instruction to the data handling component to distribute the replica to the target replica locations.

2. The method according to claim 1, wherein each time a handover is determined the target replica locations are determined for the master replica and the at least one slave replica.

3. The method according to claim 1, wherein the location of the master replica is determined to be located at a first node of the cloud environment which is located as close as possible to the serving application instance, wherein the location of the at least one slave replica is determined to be located at at least one second node which is a direct neighbor to the first node in the cloud environment.

4. The method according claim 3, further comprising:
   determining a latency requirement of the data session, wherein a number of slave replicas to be distributed to the at least one second node is determined taking into account the determined latency requirement.

5. The method according to claim 4, wherein a plurality of slave replicas are present, wherein when the latency requirement is higher than a first threshold, the locations of the second nodes of the plurality of slave replicas are determined such that each second node in the cloud environment which is a direct neighbor to the first node comprises one of the slave replicas.

6. The method according to claim 1, further comprising:
   informing one of the at least one slave replicas stored at the target location of the target application instance to take over the role of the master replica for the target application instance; and
   determining a new location of an additional slave replica taking into account the target location of the said one slave replica taking over the role of the master replica.

7. The method according to claim 1, further comprising:
   determining a mobility of the user equipment including a direction of the mobility and determining the location of the target replica locations taking into account the determined mobility.

8. The method according to claim 7, further comprising:
   detecting when the user equipment coming from a first geographical area approaches a coverage boundary leading to a second geographical area, where the data session will be controlled by the target application instance, wherein upon detecting that the user equipment approaches the coverage boundary, it is determined to locate the at least one slave replica at a node of the cloud environment located in the second geographical area.

9. The method according to claim 1, wherein the target replica locations for the master replica and the at least one slave replica are determined based on knowledge about a topology of the cloud environment and of the cellular network.

10. A method for operating a data handling component, the method comprising:
    receiving, from a serving application instance, a replica of externalized session state data for a data session exchanged via a cellular network between the serving application instance and a user equipment, wherein the replica comprises a master replica and at least one slave replica;
    receiving, from a replication control component, target replica location information and an instruction to distribute the replica to the target replica locations;
    determining, from the target replica location information on a per data session basis, a target replica location of the master replica that is collocated at a first node as close as possible to the serving application instance and a target replica location of the at least one slave replica that is located in at least one second node which is a direct neighbor to the first node; and
    distributing the replica of the session state data to the determined target replica locations.

11. The method according to claim 10, wherein determining the target replica location comprises receiving location information about the target replica locations from the replication control component and deducing the target replica location from the received location information.

12. The method according to claim 10, wherein when an amendment to the session state data stored in the replica is requested, it is checked whether the replica for which the amendment is requested is a master replica, wherein the amendment is only allowed for the master replica and not allowed for the at least one slave replica.

13. The method according to claim 10, wherein when an amendment of the session state data in the master replica is detected, the amendment is replicated to the at least one slave replica upon detection of the amendment.

14. The method according to claim 10, wherein the application instances are located on edge nodes of the cloud environment.

15. A replication control component comprising:
a memory and at least one processor, the memory containing instructions executable by said at least one processor, wherein the replication control component is operative to:
collect information about mobility of a user equipment;
determine, based on the information, that a handover takes place by which a data session exchanged via a cellular network between a serving application instance and the user equipment is transferred from the serving application instance to a target application instance selected from a plurality of application instances located in a cloud environment, wherein the data session comprises session state data;
determine a location of the target application instance in the cloud environment;
determine target replica locations of replica of the session state data individually on a per session basis for said data session during its runtime taking into account the location of the target application instance, wherein the replica comprises a master replica and at least one slave replica and the target replica locations are determined for the master replica and the at least one slave replica;
predict a trajectory of the user equipment;
determine the target replica location of the master replica that is collocated at a first node as close as possible to the serving application instance taking into account the projected trajectory;
determine the target replica location of the at least one slave replica that is located in at least one second node which is a direct neighbor of the first node; and
transmit, to the data handling component, a message comprising the target replica locations and an instruction to the data handling component to distribute the replica to the target replica locations.

16. A data handling component comprising:
a memory and at least one processor, the memory containing instructions executable by said at least one processor, wherein the replication control component is operative to:
receive, from a serving application instance, a replica of externalized session state data for a data session exchanged via a cellular network between the serving application instance and a user equipment, wherein the replica comprises a master replica and at least one slave replica;
receive, from a replication control component, target replica location information and an instruction to distribute the replica to the target replica locations;
determine, from the target replica location information on a per data session basis, a target replica location of the master replica that is collocated at a first node as close as possible to the serving application instance and a target replica location of the at least one slave replica that is located in at least one second node which is a direct neighbor to the first node; and
distribute the replica of the session state data to the determined target replica locations.

* * * * *